United States Patent [19]

Spickelmire

[11] Patent Number: 5,673,779
[45] Date of Patent: Oct. 7, 1997

[54] TELESCOPIC DISCHARGE CHUTE FOR BULK MATERIAL

[76] Inventor: W. James Spickelmire, 724 S. "C" St., Grangeville, Id. 83530

[21] Appl. No.: 525,831

[22] Filed: Sep. 7, 1995

[51] Int. Cl.⁶ .................................................. B65G 11/00
[52] U.S. Cl. ........................... 193/6; 193/30; 414/299
[58] Field of Search ........................ 193/6, 30; 414/299

[56] References Cited

U.S. PATENT DOCUMENTS

| | | | |
|---|---|---|---|
| 4,340,136 | 7/1982 | Hanrot et al. | 193/30 |
| 4,755,061 | 7/1988 | Goins | 193/30 |
| 5,154,271 | 10/1992 | Binzen | 193/30 |

*Primary Examiner*—Joseph E. Valenza
*Attorney, Agent, or Firm*—Wells, St. John, Roberts, Gregory & Matkin P.S.

[57] ABSTRACT

A telescopic discharge chute for bulk materials is described including telescoping first and second elongated tubular members. The first tubular member includes a first internal bore leading from a bulk material infeed at a first top end, to first bottom end. The second elongated tubular member includes a second top end and a bulk material discharge at a second bottom end. The second tubular member slides axially over the first tubular member between an extended position wherein the second tubular member projects axially downwardly from the first tubular member. At least one vent is formed by the second tubular member adjacent the second top end, opening outwardly and in open communication with the second internal bore. The vent is situated above the first bottom end of the first tubular member. The vent is included in a ventilation air passageway defined between the first and second tubular members. The passageway extends axially from an upper end in open communication with the vent to a lower discharge end in open communication with the first internal bore downwardly of the vent. Flanges on the first and second tubular members engage to prevent the second tubular member from sliding longitudinally off the bottom end of the first tubular member.

15 Claims, 3 Drawing Sheets

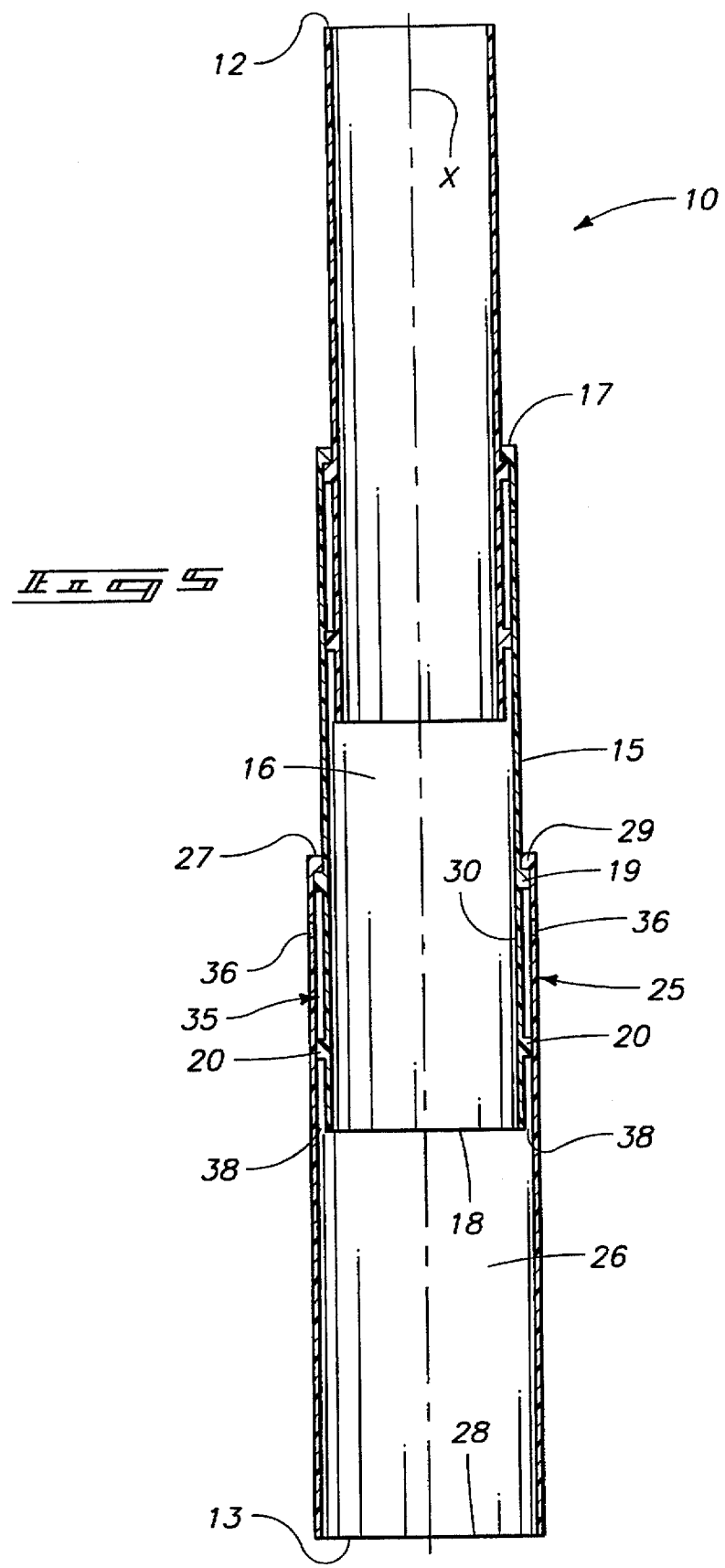

TELESCOPIC DISCHARGE CHUTE FOR BULK MATERIAL

TECHNICAL FIELD

The present invention relates to passing bulk materials through a chute, and particularly to telescopic discharge chutes used for delivery of bulk materials.

BACKGROUND OF THE INVENTION

Hollow tubular chutes have been in long use for containing and directing bulk materials such as grain, seed, fertilizer, and other materials from a source such as a storage bin, to another location. It is typical that the materials are conveyed by auger, belt or other conventional conveyance to the intake end of the discharge chute. The chute is typically suspended over the area to receive the bulk materials. The chute guides the materials which usually fall by gravity or are forced by pump or blower action through the chute interior.

It is not unusual for discharge chutes to be provided in telescoping members to enable adjustment of the chute length. The various telescoping members are connected to a cord and pulley arrangement which may be operated to contract and extend the chute sections.

It has been found that materials being gravity fed through a tubular chute tend to build a vacuum within the chute. Vacuum buildup within a discharge chute slows the flow of materials dropping through the chute.

Also, with certain materials, and with certain discharge chutes, dust becomes a problem. Dust tends to seep between seams of prior discharge chute telescoping members, causing a hazard for workers in the area.

The present invention serves to reduce such problems by providing a novel discharge chute by which materials and air flow through the length of the tube are ventilated by a venturi action so vacuum buildup is eliminated and flow through the tube is increased. Further, the present novel discharge tube is ventilated to reduce or eliminate dust seepage from the tube.

BRIEF DESCRIPTION OF THE DRAWINGS

Preferred embodiments of the invention are described below with reference to the accompanying drawings, which are briefly described below.

FIG. 5 is an enlarged longitudinal sectioned view through the chute.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
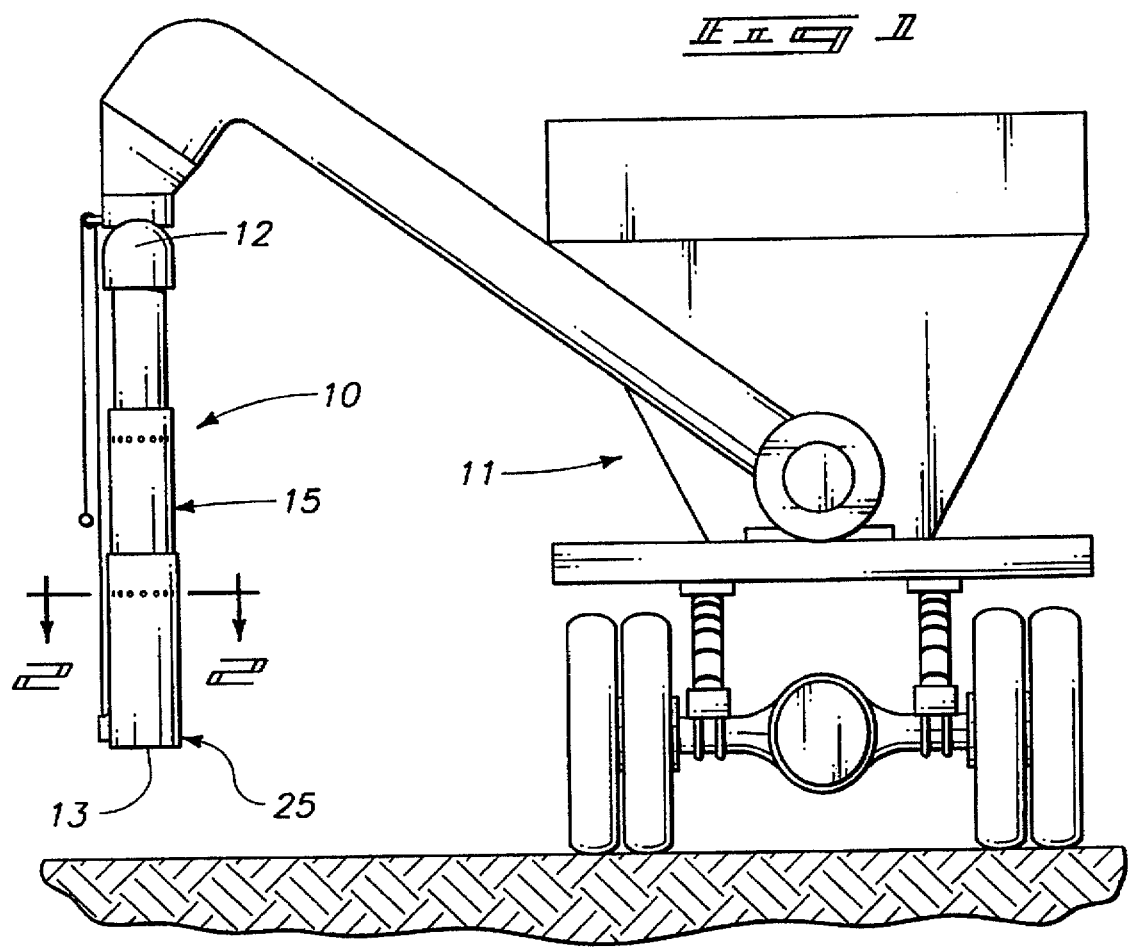
FIG. 1 is a diagrammatic view of a first preferred form of the present discharge chute mounted to a bulk delivery truck.

A telescopic discharge chute for bulk materials embodying features of the present invention is illustrated in the drawings and is designated generally therein by the reference number 10. The chute 10 is shown in FIG. 1 attached to a bulk material delivery truck 11. The materials are delivered by conventional auger mechanisms to the chute for discharge by gravity. The chute 10 is used to deliver bulk materials, dry or liquid, typically by gravity from an inlet end 12 through a discharge end 13.

The truck is shown simply as one example of many sources for bulk material delivery systems in which the chute 10 may be used. Other sources may include bulk material storage bins, hoppers, tanks, storage piles, or any other source. Further, the delivery system used to move the materials from the source to the chute may take many forms as well.

Figures 2, 3:
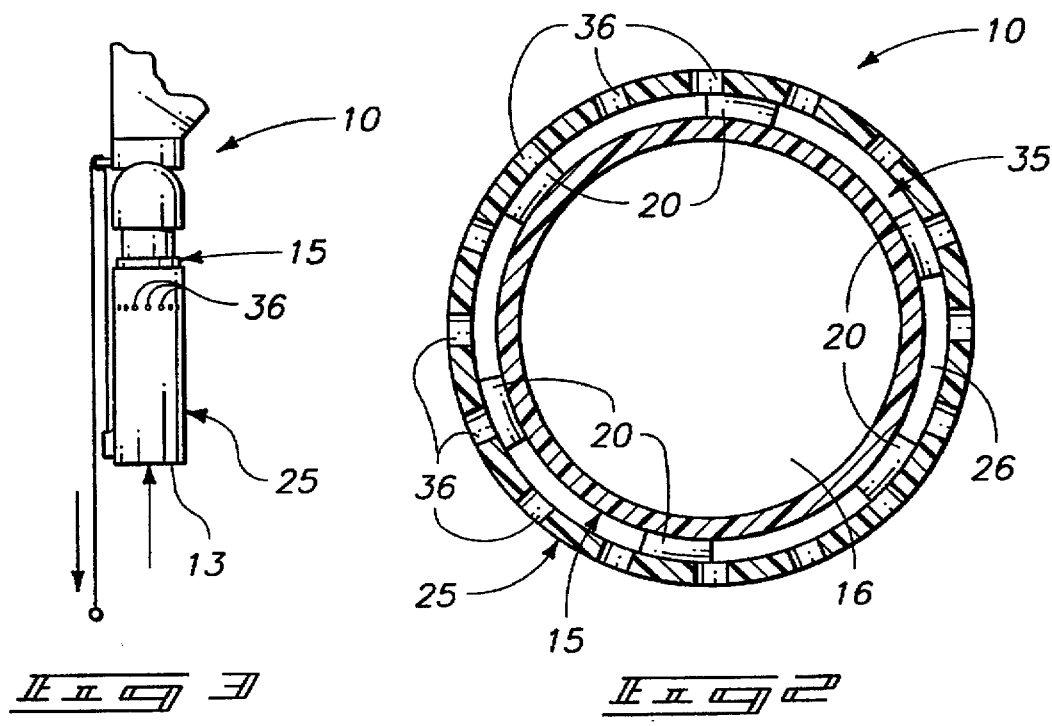
FIG. 2 is an enlarged sectional view taken along line 2—2 in FIG. 1.
FIG. 3 is a view of the discharge chute in a retracted position.

As shown in a present preferred form, the discharge chute 10 telescopes between an extended position (FIGS. 1, 4, and 5) and a retracted position (FIG. 3). The chute is thus formed of interfitting telescoping members, the number of which may vary with the application desired.

Three members are shown extended in FIGS. 1 and 5. A shorter discharge chute may require only two telescoping members. A longer chute may require more members. It is pointed out however that a chute of multiple members may be selectively shortened simply by retracting one or more of the sections into one another.

Further, the cross-sectional size and lengths of the chute members may vary as needed and in accordance with the materials to be handled. For example, large chutes may be advisable for discharging large quantities of materials or where such materials would otherwise tend to bridge and bind within smaller chute sizes.

It is advantageous that the chute members be constructed of seamless plastic tubing. One example of a preferred plastic material is HMW (high molecular weight) polyethylene plastic, which may be extruded in desired lengths, with nearly any desired wall thickness and cross-sectional diameters. Such plastic material has useful strength, low friction, high wear resistance, and high resistance to corrosion characteristics that lend themselves well to use with the present invention. Also, such materials are common and relatively inexpensive.

It is preferred but not necessary that the telescoping tubular members of the present chute be circular in cross section (FIG. 2). However, other cross-sectional configurations may be used as well. For example square, rectangular, elliptical or other tubular configurations might also be used. Such members however should be complementary and interfit telescopically as shown.

The preferred chute members are seamless along their lengths. Seamless construction is advantageous in that little if no dust or seepage of fine particulate is permitted except through the discharge end 13.

The chute 10 is made up, as indicated above, of several interfitting, telescoping members. Portions of a typical pair of members are detailed in the drawings at FIG. 4. It should be understood that the two members shown may be typical of several or all such members along the chute 10. Description of the two members shown in FIG. 4 will thus serve for description of remaining members, if any, that are used in the overall chute length.

Figure 4:
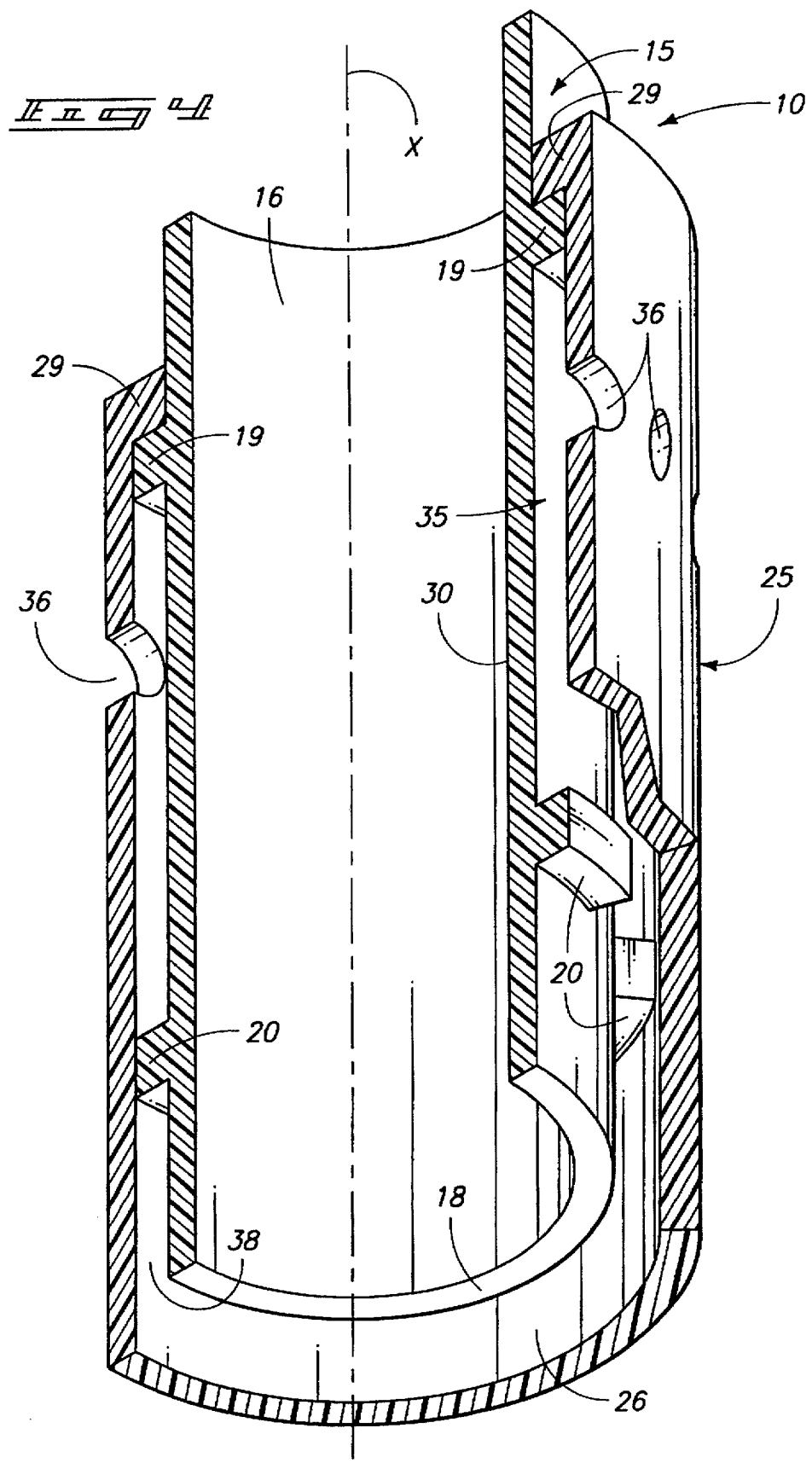
FIG. 4 is an enlarged fragmented perspective view showing connection of first and second tubular members in a preferred form of the present invention.

The joined portions of the two members shown in FIG. 4 represent a typical joint along the chute. The remaining joints between successive tubular members are similar, as shown in FIG. 5, except for tube size. For example, as shown in FIG. 5, the two joined tubular members at the upward end of the chute 10 would have smaller cross-sectional diameters than two at the bottom end of the tube. This is done so the bottom members will telescopically slide over the top members. Proportions between members will otherwise remain similar.

Given the above similarities, further description of two interconnected first and second elongated tubular members 15 and 25 will serve for description of the remaining sets of interfitting members, if more are used.

In FIG. 4, the first elongated tubular member 15 is shown including a first internal bore 16. The bore 16 extends along a central longitudinal axis X from a bulk material infeed at a first top end 17 (best shown in FIG. 5) to a first bottom end 18 (FIG. 4).

A first flange 19 is provided on the first tubular member 15. The first flange 19 is spaced upwardly from the first bottom end 18, and projects laterally outwardly of member 15. The flange 19 exemplified in the drawings is substantially continuous about the first tubular member 15. Flange 19 may be integral with the first tubular member 15 or, alternatively, may be attached to the tubular member 15 by conventional means such as adhesives.

The first flange 19 is positioned to engage a second flange 29 (described below) on the second tubular member 25, to prevent the second tubular member 25 from sliding longitudinally off the bottom end 18 of the first tubular member 15.

The first tubular member 15 may also include at least one and preferably several spacers 20, spaced downwardly of the first flange 19 and adjacent the first bottom end 18. The spacers 20 slidably engage the inside wall of the second tubular member 25. They function to substantially center and slidably brace the first tubular member within the second tubular member 25.

The spacers 20 may be integral with or otherwise attached to the first tubular member 15. Alternatively, the spacers 20 could be integral with or attached to the second tubular member 25 to similarly slidably engage and brace the first tubular member 15.

Several spacers 20 are substantially equiangularly spaced (FIG. 2) about the first tubular member. Such spacing is intended to provide for air passage between spacers and between the first and second tubular members 15, 25.

Referring back again to FIG. 4, the second elongated tubular member 25 is shown including a second internal bore 26. The second bore 26 openly communicates with the first bore 16 of first tubular member 15, and is sized to slidably receive the first tubular member 15 with an airspace between the two.

The second bore 26 extends along the central axis X between a second top end 27 and a bulk material discharge at a second bottom end 28 that is best shown in FIG. 5.

A second flange 29 is provided adjacent the second top end 27. Second flange 29 is annular, forming an internal closed shape complementary to the first tubular member 15. The second flange 29 will thus slidably receive the first tubular member 14, and will engage the first flange 19 when the two members are extended. The second tubular member 25 is thus prevented from sliding downwardly off the first tubular member 15.

The second tubular member 25 slides axially over the first tubular member 15 between extended and retracted positions.

In the extended position (FIG. 5), the second tubular member 25 projects axially downwardly from the first tubular member 15. Here the second bottom end 28 is spaced a first axial distance from the first bottom end 18.

In the retracted position (FIG. 3), the second bottom end 28 is spaced a second axial distance from the first bottom end 18. The second axial distance is less than the first distance In both positions, a portion of the first tubular member 15 is overlapped axially by the second tubular member 25. In other words, the second top end 27 (of second tubular member 25) is always situated above the first bottom end 18 (of the first tubular member 15).

In the extended position, an axial section 30 of the first tubular member 15, between the first flange 19 and first bottom end 18 thereof extends axially into the second bore 26 of the second tubular member 25.

A ventilation passageway 35 is formed along the axial section (when the members are extended) between the first and second tubular members 15, 25. A section of the passageway 35 extends axially from an upper end in open communication with ambient air through a vent 36 in the second tubular member, to a lower discharge end 38 in open communication with the first internal bore downwardly of the vent 36.

In a preferred form, the passageway 35 includes multiple vents 36 that are formed in the second tubular member adjacent its second top end 27, each opening outwardly of the chute and opening into the second internal bore 26, outward of the first tubular member 15. The vents 36 are situated above the first bottom end 18 of the first tubular member 15 and the passageway 35 extends downward from the vents 36 to the open, annular discharge end 38.

Operation of the present invention may be initiated following connection of the chute to a delivery source such as the auger conveyor, blower, pump, or gravity discharge of the bulk material source. The smallest diameter tubular member of the chute 10 is connected to the source to first receive the bulk material substantially as shown in FIG. 1.

It is preferred that the chute be suspended as shown, with the tubular members substantially upright for optimal gravity flow. However, it may be inclined if desired, to an angle greater than the angle of repose for the materials being delivered. The angle of inclination may approach the horizontal if the material is to be pumped, blown, or otherwise forced through the chute.

The length of the chute may be selectively varied by use of a conventional adjustment mechanism, one of which is illustrated in FIGS. 1 and 3. It is preferred that at least two of the telescoping members be extended for optimal operation.

Once the chute is properly mounted, operation is initiated simply by dropping or otherwise moving the bulk material through the chute. The material will slide easily along through the chute and be discharged through the bottom end of the largest tubular member at the bottom end of the chute.

During operation, the passageway 35 ventilates the chute along its length, in such a manner that flow through the chute is increased (by eliminating vacuum resistance to flow found in prior chutes). In addition, dust from the chute is minimized since the chute construction in the vicinity of the passageway forms a venturi.

Materials passing downwardly through the chute from the confines of the smaller first tubular member 15 and into the larger second tubular member 25, produce a low pressure area at the annular discharge end 38 of the passage. Air is thus drawn inwardly through the passageway 35, preventing escape of dust through the vents.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A telescopic discharge chute for bulk materials, comprising:

a first elongated tubular member including a first internal bore extending between a first top end and a first bottom end;

a second elongated tubular member including a second internal bore extending between a second top end and a second bottom end;

wherein the first and second tubular members telescopically interfit with the internal bores in substantial open communication;

the tubular members defining a ventilation air passage, situated between the first top end and second bottom end and leading from outside the tubular members into one of the bores; and flanges on the first and second tubular members, engageable to prevent the second tubular member from sliding longitudinally off the bottom end of the first tubular member.

2. A telescopic discharge chute for bulk materials as claimed by claim 1, wherein the first and second tubular members are elongated along an axis, and wherein the air passage includes a section extending axially along and between the first and second tubular members.

3. A telescopic discharge chute for bulk materials as claimed by claim 1, wherein the flanges are comprised of:

a first flange on the first tubular member situated upwardly of the first bottom end;

a second flange on the second tubular member situated adjacent the second top end thereof; and wherein an axial section of the first tubular member between the first flange and first bottom end thereof extends into the second bore of the second tubular member.

4. A telescopic discharge chute for bulk materials as claimed by claim 1, wherein the flanges are comprised of:

a first flange on the first tubular member situated upwardly of the first bottom end thereof;

a second flange on the second tubular member situated adjacent the second top end thereof;

wherein an axial section of the first tubular member extends between the first flange and first bottom end thereof within the second bore of the second tubular member; and wherein at least part of the air passage is defined along said axial section of the first tubular member.

5. A telescopic discharge chute for bulk materials as claimed by claim 1, wherein the flanges are comprised of:

a first flange on the first tubular member situated upwardly of the first bottom end;

a second flange on the second tubular member situated adjacent the second top end thereof;

wherein an axial section of the first tubular member between the first flange and first bottom end thereof extends into the second bore of the second tubular member; and a spacer on one of the tubular members located downward of the first and second flanges, slidably engaging the other one of the tubular members.

6. A telescopic discharge chute for bulk materials as claimed by claim 1, wherein the flanges are comprised of:

a first flange on the first tubular member situated upwardly of the first bottom end;

a second flange on the second tubular member situated adjacent the second top end thereof;

wherein an axial section of the first tubular member between the first flange and first bottom end thereof extends into the second bore of the second tubular member; and a spacer on the first tubular member located downward of the first flange, slidably engaging the tubular member.

7. A telescopic discharge chute for bulk materials as claimed by claim 1, wherein the ventilation passageway is formed by a vent formed through the second tubular member, and an airspace between the first and second tubular members openly communicating with the vent.

8. A telescopic discharge chute for bulk materials as claimed by claim 1, wherein the ventilation passage is formed by (a) a vent formed by the second tubular member, between the second top end and the first bottom end, and (b) an airspace between the first and second tubular members openly communicating with the vent.

9. A telescopic discharge chute for bulk materials as claimed by claim 1, wherein the ventilation passage is formed by (a) a vent formed by the second tubular member, between the second top end and the first bottom end, and (b) an airspace between the first and second tubular members openly communicating with the vent; and further comprising a spacer on one of the tubular members located within the air space downward of the first and second flanges, slidably engaging the other one of the tubular members.

10. A telescopic discharge chute for bulk materials as claimed by claim 1, wherein the ventilation passage is formed by (a) a vent by the second tubular member, between the second top end and the first bottom end, and (b) an airspace between the first and second tubular members openly communicating with the vent; and further comprising a spacer on the first tubular member located within the airspace downward of the first and second flanges, slidably engaging the second tubular member.

11. A telescopic discharge chute for bulk materials, comprising:

a first elongated tubular member including a first internal bore extending along a central longitudinal axis from a bulk material infeed at a first top end, to first bottom end;

a second elongated tubular member including a second internal bore extending between a second top end and a bulk material discharge at a second bottom end;

wherein the first tubular member fits telescopically within the second internal bore of the second tubular member with the internal bores in substantial open axial communication;

wherein the second tubular member slides axially over the first tubular member between an extended position wherein the second tubular member projects axially downwardly from the first tubular member with the second bottom end spaced a first axial distance from the first bottom end, and a retracted position wherein the second bottom end is spaced a second axial distance from the first bottom end, the second distance being less than the first distance;

at least one vent formed by the second tubular member adjacent the second top end, opening outwardly thereof and in open communication with the second internal bore;

wherein the vent is situated above the first bottom end of the first tubular member;

a ventilation air passageway defined between the first and second tubular members and including the vent, the passageway extending axially from an upper end in open communication with the vent to a lower discharge end in open communication with the first internal bore downwardly of the vent; and flanges on the first and second tubular members, engageable to prevent the second tubular member from sliding longitudinally off the bottom end of the first tubular member.

12. A telescopic discharge chute for bulk materials as claimed by claim 11, wherein the first and second tubular members are formed of seamless plastic.

13. A telescopic discharge chute for bulk materials as claimed by claim 11, wherein the first tubular member includes a cross sectional size less than that of the second tubular member.

14. A telescopic discharge chute for bulk materials as claimed by claim 11, wherein the lower discharge end of the passageway is spaced laterally of the first internal bore.

15. A telescopic discharge chute for bulk materials as claimed by claim 11, wherein the first and second tubular members are formed laterally of the first internal bore, of plastic; and wherein the lower discharge end of the passageway is spaced laterally of the first internal bore.

* * * * *

UNITED STATES PATENT AND TRADEMARK OFFICE
CERTIFICATE OF CORRECTION

PATENT NO. : 5,673,779

DATED : October 7, 1997

INVENTOR(S) : W. James Spickelmire

It is certified that error appears in the above-identified patent and that said Letters Patent is hereby corrected as shown below:

Column 6, line 15, after "engaging the" insert --second--.

Column 8, line 13, after "formed" delete "laterally of the first internal bore."

Signed and Sealed this

Twenty-seventh Day of January, 1998

Attest:

BRUCE LEHMAN

Attesting Officer

Commissioner of Patents and Trademarks